United States Patent [19]

Meinel

[11] Patent Number: 5,718,077
[45] Date of Patent: Feb. 17, 1998

[54] LEADER FOR FLY FISHING

[76] Inventor: Marion Meinel, Paul-Ernst-Strasse 18, D-82549 Königsdorf, Germany

[21] Appl. No.: 401,561

[22] Filed: Mar. 9, 1995

[30] Foreign Application Priority Data

Mar. 9, 1994 [DE] Germany .......................... 94 03 969 U
Aug. 30, 1994 [DE] Germany .......................... 94 14 013 U

[51] Int. Cl.⁶ ................................................. A01K 91/00
[52] U.S. Cl. ................................................. 43/44.98
[58] Field of Search ................................................. 43/44.98

[56] References Cited

U.S. PATENT DOCUMENTS

| | | | |
|---|---|---|---|
| 2,744,173 | 12/1956 | Thienemann | 43/44.98 |
| 3,453,769 | 7/1969 | Chandler | 43/44.98 |
| 3,758,979 | 9/1973 | Martuch et al. | 43/44.98 |
| 3,831,309 | 8/1974 | Martuch | 43/44.98 |
| 3,864,865 | 2/1975 | Swisher | 43/44.98 |
| 3,871,123 | 3/1975 | Olson | 43/44.98 |
| 3,888,037 | 6/1975 | Warthen | 43/44.98 |
| 4,155,973 | 5/1979 | Klein | 43/44.98 |
| 4,459,337 | 7/1984 | Hansen | 43/44.98 |
| 4,505,952 | 3/1985 | Chambley | 43/44.98 |
| 4,779,372 | 10/1988 | Pozo Obeso | 43/44.98 |

*Primary Examiner*—Kurt Rowan
*Attorney, Agent, or Firm*—Steinberg, Raskin & Davidson, P.C.

[57] ABSTRACT

A leader for connecting a fishing hook to a fishing line, including an elongate member having a diminishing cross-section formed of a single material and having a thick end and a thin end. The member has a butt section encompassing the thick end and connected to the fishing line and a tippet section encompasses the thin end and connected to the fishing hook. The leader includes material integrated with the member to provide a variable stiffness of the member such that the tippet section has a lower stiffness than the butt section.

10 Claims, 2 Drawing Sheets

LEADER FOR FLY FISHING

BACKGROUND OF THE INVENTION

The present invention relates to a leader for fly fishing which connects a fishing hook to a main line of a fishing tackle.

In angling and sport angling, an angling hook is generally not connected directly to the main fishing line but is attached to a short line, i.e., a leader, which is in turn connected to the main fishing line.

The main task of the leader is to protect the main line from excessive loads which could lead to the rupture of the main line. For this reason, the leader is designed for a lower tensile strength than the main line, e.g., due to a smaller line diameter. If very large forces occur when a fish is being reeled in, the leader breaks before the main line can be damaged.

In one particular domain of sport fishing, i.e., fly fishing, a leader with the same diameter throughout has proven to be disadvantageous. Instead, it is advantageous that the leader should be tapered, soft and flexible at the tip so that the fly can be posed on the water surface in as natural a manner as possible.

On the other hand, at the thick end of the leader opposite to the tip, the tapering leader should be hard and stiff in order to avoid fouling the line when it is cast. A stiff leader also has the advantage of lying on the water in a straight line and thus to shorten the lift.

The combination of softness and stiffness of the leader was obtained in the past by knotting the leader together from short rectilinear segments of different thickness. In this manner, the thick end of the leader (the butt) was connected to the main line and the thin end (the tippet) to the hook. The mechanical characteristics of a leader knotted together in this manner are however not totally satisfactory. Since the leader is made of a uniform material, the stiffness of the leader can only be regulated through the thickness of the individual rectilinear segments. In this manner, the accessible range of variation is strictly limited.

Further progress in this regard consisted in the introduction of a knot-less, tapering leader. In such a construction, the expensive knotting together of several rectilinear segments could be avoided and the stiffness of the line decreased between the butt and the tippet because the thickness of the line was decreasing constantly. But in this situation, the leader was made of a uniform material so that the stiffness of the monofilament is regulated only through the thickness of the line. The tapering, knotless leader is also easier to manufacture than the knotted leader, but still does not allow for greater variability with respect to the stiffness profile of the leader.

To overcome this disadvantage, the state of the art proposes several solutions.

German patent application DE-A-33 08 715 describes a leader made of a tapering monofilament provided with an envelope near the butt to increase stiffness.

U.S. Pat. No. 3,453,769 describes a leader made up of two tapering rectilinear segments knotted together, whereby the rectilinear segment constituting the butt is made of a material of greater stiffness than the material of the tippet.

The manufacturing technology for these known leaders is however very expensive and therefore results in correspondingly high production costs. This is because different materials must always be processed, be it for the envelope of the monofilament, or to produce the rectilinear segment of the knotted leader. Furthermore, the leader of DE-A-33 08 715 as well as the leader of U.S. Pat. No. 3,453,769 feature a marked jump in the stiffness profile along the leader. In the first reference, this jump occurs at the transition from the enveloped to the non-enveloped segment of the leader, whereas in the latter reference, the jump occurs at the point of connection between the two segments of the leader, made of different materials. As a result, the casting characteristic of the fishing line is unsatisfactory and a natural presentation of the "fly" on the surface of the water is not possible.

In view of the disadvantages of the leader known from U.S. Pat. No. 3,453,769, a drastic change is made in U.S. Pat. No. 3,758,979 which describes a leader which has a relatively rigid core and an envelope made of a more flexible material which tapers towards the tippet, so that the tippet is stiffer than the butt (see claim 1 therein). The characteristics of this leader are however not satisfactory, so that this embodiment was not able to find acceptance.

A further disadvantage in known leaders is the glossy surface of the monofilament or of the rectilinear segments which risks irritating the fish because of light reflections.

OBJECTS AND SUMMARY OF THE INVENTION

It is therefore an object of the present invention to provide a leader the stiffness and softness profile of which is adapted in an optimal manner to the requirements of fly fishing.

Furthermore, it is an object of the invention to make the surface of the leader so that the leader cannot or can only barely be perceived by the fish.

These objects, and others, are attained by the leader according to the invention, whereby the leader has a tippet which is flexible, a butt which has the approximate hardness and stiffness of the main line, and possesses a matted surface. The leader in this case is made of one single material the stiffness of which can be influenced by adding additives in the butt or tippet area.

The leader according to the invention may be a tapering monofilament or a leader knotted together or welded together from several rectilinear segments.

Advantages of the leader according to the instant invention include the fact that the tippet can be made more flexible and the butt stiffer than in a conventional tapering or knotted leader. At the same time, an extreme jump in stiffness does not occur along the leader. As a result, the "fly" can be presented on the water in a natural movement. On the other hand, a stiff butt makes it possible to cast the line reliably, without danger of fouling it, and also ensures a relative straight alignment of this part of the leader on the water. Combined with the dull, matted surface, the fish cannot, or can only barely recognize the leader. Since neither different materials nor an envelope structure are used, and since the modification of the leader material can be obtained by means of appropriate auxiliary materials instead of simple impregnation, the leader can be produced very economically.

The leader is preferably of a different color at the butt and at the tippet, with the tippet being preferably light and the butt preferably dark in color contrasting to the light color of the tippet.

Briefly, in accordance with the invention, the leader for connecting a fishing hook to a fishing line, comprises an elongate member having a diminishing cross-section formed of a single material and having a thick end and a thin end. The member has a tippet section which encompasses the thick end and is connected to the fishing line and a butt section which encompassed the thin end and is connected to the fishing hook. The leader also includes means integrated with the member for providing a variable stiffness of the member in a longitudinal direction thereof such that the tippet section has a lower stiffness than the butt section. The means for providing a variable stiffness preferably comprise softening agents whereby the concentration of the softening agents in member decreases in the longitudinal direction thereof from the tippet section to the butt section.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
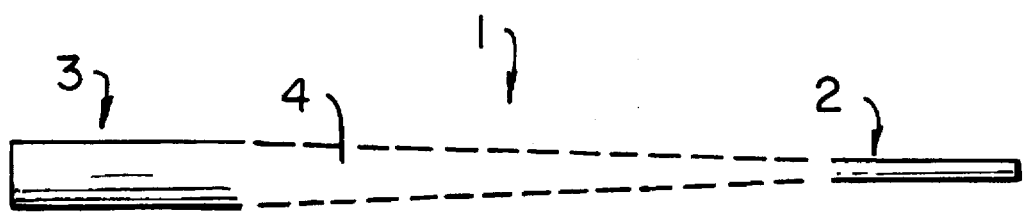
FIG. 1 shows a view of the two greatly enlarged ends of a first embodiment of the invention, whereby the leader is a knotless, tapering monofilament.

Referring to the accompanying drawings, a first embodiment of a leader 1 according to the invention is shown in FIG. 1 and has typically a length of approximately 200 cm to about 450 cm, with a light colored tippet 2 (thin end of the leader) being 60 to about 70 cm long. The leader 1 tapers in an axial direction thereof uniformly without knots from butt 3 (the thick end of the leader) in the direction of the tippet 2. The diameter at the thick end or butt 3 of the leader lies preferably within a range of 0.4 mm to about 0.7 mm and the diameter at the thin end or tippet 2 lies within a range of 0.1 mm to about 0.4 mm.

The leader is preferably made of a synthetic material, in particular of a polyamide, polyester, polyurethane or polyolefine, preferably in the form of a stretched monofilament. Polyamide is especially preferred for the leader.

Figure 2:
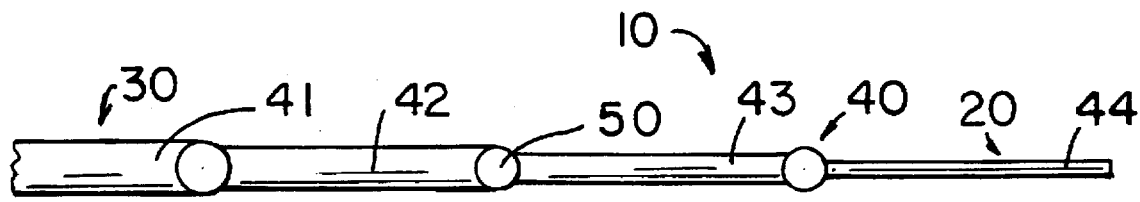
FIG. 2 shows a view of a second embodiment in which the leader is connected together from individual rectilinear segments of different diameters, whereby the thickness of the rectilinear segments in relation to the length of the leader is greatly exaggerated in the drawing.

A knotted leader 10 in accordance with a second embodiment of the invention is shown in FIG. 2. Leader 10 typically has a length of approximately 200 cm to about 400 cm and generally consists of 5–10 individual rectilinear segments 41, 42, 43, 44, . . . . The rectilinear segments generally have different diameters which decrease along the axis of the leader 30 from butt 30 to tippet 20 and are tied together, e.g., with knots, in the areas 50. The diameter of an individual rectilinear segment is substantially constant over its length. The thinnest line of the leader, a light colored tippet 20, is generally approximately 60 cm to about 200 cm long. The length of the individual rectilinear segments also decreases preferably in the axial direction of the leader from the tippet 20 to the butt 30. The diameter at the thick end or butt 30 of the leader 10 lies within the range of from about 0.35 mm to about 0.7 mm and the diameter of the leader 10 lies at the thin end 20 lies within the range of from about 0.1 mm to about 0.4 mm depending on the type of utilization.

The leader 10 according to the invention is preferably made of a synthetic material, in particular of a polyamide, polyester, polyurethane or polyolefine, whereby the individual rectilinear segments are preferably segments of a stretched monofilament. Polyamide is the preferred material for the knotted leader 10.

The knotless, tapering leader 1 can be obtained by treating the tippet 2 in a known manner with a softener, e.g., softening agents. The knotted leader 10 can be obtained by treating the monofilaments from which the individual rectilinear segments 41, 42, 43, 44 are cut, in a known manner with softeners. Suitable softeners and their application to all of the line materials considered here are known, as can be found for example in Ullmanns "Enzykopädie der technischen Chemie" (Encyclopedia of technical Chemistry), 4th edition, vol 24, page 349ff. The tippet is treated in this case so that it is the softest and most flexible segment, with the concentration of the softeners decreasing in the line or rectilinear segments in the direction of the butt so that the hardness of the line or rectilinear segments increases in the direction of the butt.

Figure 2A:
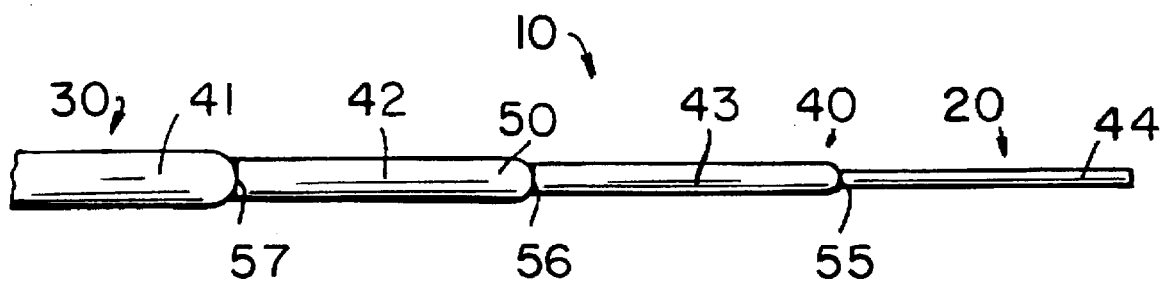
FIG. 2A shows an embodiment wherein the segments of the leader are welded together.
Figure 2B:
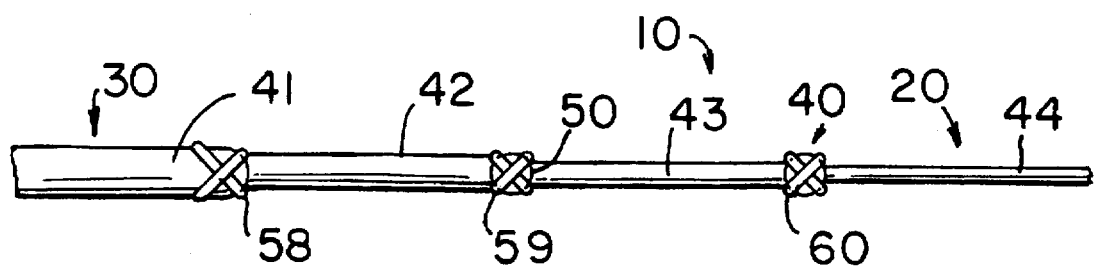
FIG. 2B shows an embodiment wherein the segments of the leader are knotted together.
Figure 2C:
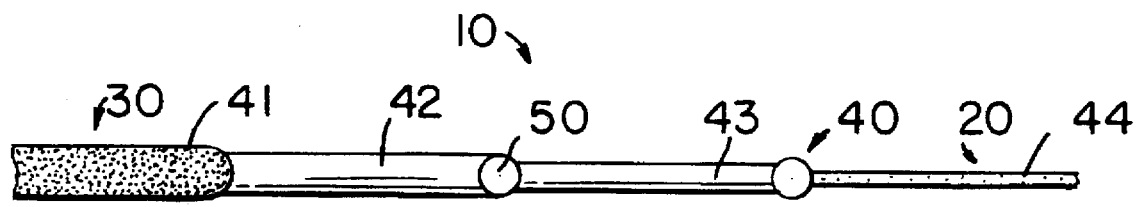
FIG. 2C shows an embodiment wherein the butt of the leader is a darker color than the tippet of the leader, viz., black in contrast to another color.
Figure 2D:
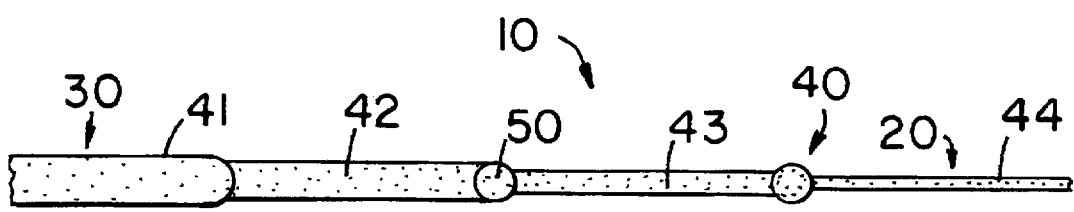
FIG. 2D shows an embodiment wherein the leader has an outer matted surface.

In a preferred embodiment shown in FIG. 2D, the leader 1, 10 has an outer matter surface. The matted surface can be obtained in a known manner, e.g. through fillers or surface treatment.

Suitable colorants or modifying means for the synthetic materials which are used in the manufacture of a fishing line and of the leader described here are known. Also the process for the application or incorporation of these means on or in the synthetic material are known, see Ullmanns Enzykopädie der technischen Chemie, vol. 11, page 293ff.

In the embodiment shown in FIG. 2A, the segments of the leader are welded together so that there is a weld 57 between segments 41 and 42, a weld 56 between segments 42 and 43 and a weld 55 between segments 43 and 44.

The embodiment shown in FIG. 2B more clearly shows the presence of knots between the segments of the leader, i.e., a knot 58 between segments 41 and 42, a knot 59 between segments 42 and 43 and a knot 60 between segments 43 and 44.

The embodiment shown in FIG. 2C shows the butt of leader, i.e., segment 41, having a darker color than the tippet of the leader, i.e., segment 44, whereby the segment 41 is black and the segment 44 is not.

The examples provided above are not meant to be exclusive. Many other variations of the present invention would be obvious to those skilled in the art, and are contemplated to be within the scope of the appended claims.

I claim:

1. A leader for connecting a fishing hook to a fishing line, comprising an elongate member formed of a single material, first variable stiffness means for providing said member with a variable stiffness in a longitudinal direction thereof, said first variable stiffness means comprising said member having a thick end and a thin end whereby said member has a diminishing cross-section from said thick end to said thin end, said member having a butt section encompassing said thick end and connected to the fishing line and a tippet section encompassing said thin end and connected to the fishing hook, and second variable stiffness means integrated with said single material forming said member for providing said member with a variable stiffness in the longitudinal direction thereof apart from the variable stiffness provided by said first variable stiffness means such that said tippet section has a lower stiffness than said butt section, said second variable stiffness means comprising softening agents, the concentration of said softening agents in said member decreasing in the longitudinal direction of said member from said tippet section to said butt section.

2. The leader of claim 1, wherein said member comprises a tapering monofilament formed without knots.

3. The leader of claim 1, wherein said member comprises a plurality of elongate, monofilament rectilinear segments arranged in the longitudinal direction of said member and connecting means for connecting ends of adjacent ones of said rectilinear segments together, said plurality of rectilinear segments having different diameters whereby the diameters of said rectilinear segments decrease in a direction from said butt section to said tippet section, each of said plurality of rectilinear segments having a substantially constant diameter, said second variable stiffness means being integrated with each of said plurality of rectilinear segments.

4. The leader of claim 3, wherein said connecting means comprise knots.

5. The leader of claim 3, wherein said connecting means comprise welds.

6. The leader of claim 1, wherein said tippet section and said butt section are colored differently.

7. The leader of claim 6, wherein said tippet section has a light color and said butt section has a dark color contrasting to the light color of said tippet section.

8. The leader of claim 1, wherein said leader is made of a synthetic material.

9. The leader of claim 8, wherein the synthetic material is polyamide.

10. The leader of claim 1, whereby said leader has an outer, matted surface.

* * * * *